United States Patent
Baba (10) Patent No.: US 8,482,799 B2
(45) Date of Patent: Jul. 9, 2013

(54) COLOR PROCESSING USING TEMPERATURE AND LIGHT SOURCE

(75) Inventor: Kenji Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 12/910,654

(22) Filed: Oct. 22, 2010

(65) Prior Publication Data

US 2011/0102821 A1    May 5, 2011

(30) Foreign Application Priority Data

Oct. 30, 2009 (JP) ................................. 2009-251355
Oct. 12, 2010 (JP) ................................. 2010-230106

(51) Int. Cl.
*H04N 1/40* (2006.01)
*G06K 15/02* (2006.01)

(52) U.S. Cl.
USPC .............................. 358/2.1; 358/1.9; 382/167

(58) Field of Classification Search
None
See application file for complete search history.

(56) References Cited

U.S. PATENT DOCUMENTS

| | | | |
|---|---|---|---|
| 5,740,079 A * | 4/1998 | Shigemori et al. ............ 356/402 |
| 2010/0053647 A1 | 3/2010 | Baba | |
| 2010/0086201 A1 | 4/2010 | Muto et al. | |

FOREIGN PATENT DOCUMENTS

JP          10-176953          6/1998

* cited by examiner

*Primary Examiner* — Barbara Reinier
(74) *Attorney, Agent, or Firm* — Fitzpatrick, Cella, Harper & Scinto (57) ABSTRACT

A first color value of a printing medium under a first light source which emits first light including light in an ultraviolet region and at a first temperature is obtained from either a measured data table or a measurement section. A second color value of the printing medium under the first light source and at a second temperature different from the first temperature is obtained from either the measured data table or the measurement section. A color value of the printing medium at a viewing temperature, which is different from the first and second temperatures, is estimated from the obtained first and second color values.

7 Claims, 10 Drawing Sheets

31 MEASURED VALUE

| CORRECTED DATA | TEMP. | C | M | Y | K | 380 [nm] | 390 [nm] | ...... | 780 [nm] |
|---|---|---|---|---|---|---|---|---|---|
| PAPER WHITE | Tt | 0 | 0 | 0 | 0 | 0.2628 | 0.3127 | ...... | 0.7719 |
| COLOR PATCH | Tt | 0 | 0 | 10 | 0 | 0.0358 | 0.0365 | ...... | 0.7278 |
|  | Tt | 0 | 0 | 20 | 0 | 0.0297 | 0.0318 | ...... | 0.5080 |
|  | Tt | 0 | 0 | 30 | 0 | 0.0258 | 0.0285 | ...... | 0.5379 |
|  | : | : | : | : | : | : | : | ·.. | : |
|  | Tt | 100 | 100 | 90 | 100 | 0.0801 | 0.0882 | ...... | 0.6761 |
|  | Tt | 100 | 100 | 100 | 100 | 0.0730 | 0.0808 | ...... | 0.7622 |

32 MEASURED DATA

| | TEMP. | C | M | Y | K | 380 [nm] | 390 [nm] | ...... | 780 [nm] |
|---|---|---|---|---|---|---|---|---|---|
| PAPER WHITE | Tm1 | 0 | 0 | 0 | 0 | 0.2628 | 0.3127 | ...... | 0.7719 |
| PAPER WHITE UV CUT | Tm2 | 0 | 0 | 0 | 0 | 0.2576 | 0.3086 | ...... | 0.7739 |
| COLOR PATCH | Tm2 | 0 | 0 | 10 | 0 | 0.0358 | 0.0365 | ...... | 0.7278 |
|  | Tm2 | 0 | 0 | 20 | 0 | 0.0297 | 0.0318 | ...... | 0.5080 |
|  | Tm2 | 0 | 0 | 30 | 0 | 0.0258 | 0.0285 | ...... | 0.5379 |
|  | : | : | : | : | : | : | : | ·.. | : |
|  | Tm2 | 100 | 100 | 90 | 100 | 0.0801 | 0.0882 | ...... | 0.6761 |
|  | Tm2 | 100 | 100 | 100 | 100 | 0.0730 | 0.0808 | ...... | 0.7622 |
| COLOR PATCH UV CUT | Tm2 | 0 | 0 | 10 | 0 | 0.0358 | 0.0365 | ...... | 0.7278 |
|  | Tm2 | 0 | 0 | 20 | 0 | 0.0297 | 0.0318 | ...... | 0.5080 |
|  | Tm2 | 0 | 0 | 30 | 0 | 0.0258 | 0.0285 | ...... | 0.5379 |
|  | : | : | : | : | : | : | : | ·.. | : |
|  | Tm2 | 100 | 100 | 90 | 100 | 0.0801 | 0.0882 | ...... | 0.6761 |
|  | Tm2 | 100 | 100 | 100 | 100 | 0.0730 | 0.0808 | ...... | 0.7622 |

FIG. 5B

| PRESET MEASURED DATA | | | | | | | | | |
|---|---|---|---|---|---|---|---|---|---|
| MEDIUM 1 / MEDIUM 2 / MEDIUM 3 | TEMP. | C | M | Y | K | 380 [nm] | 390 [nm] | ... | 780 [nm] |
| PAPER WHITE | T1 | 0 | 0 | 0 | 0 | 0.2628 | 0.3127 | ...... | 0.7719 |
|  | T2 | 0 | 0 | 0 | 0 | 0.2576 | 0.3086 | ...... | 0.7739 |
|  | T3 | 0 | 0 | 0 | 0 | 0.2640 | 0.3145 | ...... | 0.7756 |
| PAPER WHITE UV CUT | T | 0 | 0 | 0 | 0 | 0.0327 | 0.0384 | ...... | 0.3721 |
| COLOR PATCH | T1 | 0 | 0 | 10 | 0 | 0.0358 | 0.0365 | ...... | 0.7278 |
|  | T1 | 0 | 0 | 20 | 0 | 0.0297 | 0.0318 | ...... | 0.5080 |
|  | T1 | 0 | 0 | 30 | 0 | 0.0258 | 0.0285 | ...... | 0.5379 |
|  | ... | ... | ... | ... | ... | ... | ... | ... | ... |
|  | T1 | 100 | 100 | 90 | 100 | 0.0801 | 0.0882 | ...... | 0.6761 |
|  | T1 | 100 | 100 | 100 | 100 | 0.0730 | 0.0808 | ...... | 0.7622 |
|  | T2 | 0 | 0 | 10 | 0 | 0.0591 | 0.0680 | ...... | 0.1865 |
|  | T2 | 0 | 0 | 20 | 0 | 0.0383 | 0.0486 | ...... | 0.2297 |
|  | T2 | 0 | 0 | 30 | 0 | 0.0232 | 0.0313 | ...... | 0.2259 |
|  | ... | ... | ... | ... | ... | ... | ... | ... | ... |
|  | T2 | 100 | 100 | 90 | 100 | 0.0659 | 0.0734 | ...... | 0.1863 |
|  | T2 | 100 | 100 | 100 | 100 | 0.0559 | 0.0644 | ...... | 0.2275 |
|  | T3 | 0 | 0 | 10 | 0 | 0.0358 | 0.0457 | ...... | 0.1886 |
|  | T3 | 0 | 0 | 20 | 0 | 0.0219 | 0.0297 | ...... | 0.2134 |
|  | T3 | 0 | 0 | 30 | 0 | 0.0637 | 0.0669 | ...... | 0.7730 |
|  | ... | ... | ... | ... | ... | ... | ... | ... | ... |
|  | T3 | 100 | 100 | 90 | 100 | 0.0448 | 0.0522 | ...... | 0.3359 |
|  | T3 | 100 | 100 | 100 | 100 | 0.0327 | 0.0384 | ...... | 0.3721 |
| COLOR PATCH UV CUT | T | 0 | 0 | 10 | 0 | 0.0358 | 0.0457 | ...... | 0.1886 |
|  | T | 0 | 0 | 20 | 0 | 0.0383 | 0.0486 | ...... | 0.2297 |
|  | T | 0 | 0 | 30 | 0 | 0.0637 | 0.0669 | ...... | 0.7730 |
|  | ... | ... | ... | ... | ... | ... | ... | ... | ... |
|  | T | 100 | 100 | 90 | 100 | 0.0801 | 0.0882 | ...... | 0.6761 |
|  | T | 100 | 100 | 100 | 100 | 0.0730 | 0.0808 | ...... | 0.7622 |

FIG. 6

LIGHT SOURCE VALUE

34 — MEASUREMENT LIGHT DATA

| | 250 [nm] | ...... | 380 [nm] | 390 [nm] | ...... | 780 [nm] |
|---|---|---|---|---|---|---|
| MEASUREMENT LIGHT | 6.6873 | ...... | 9.8000 | 10.9000 | ...... | 241.6800 |

35 — ACTUAL ENVIRONMENTAL VIEWING LIGHT DATA

| | 250 [nm] | ...... | 380 [nm] | 390 [nm] | ...... | 780 [nm] |
|---|---|---|---|---|---|---|
| ACTUAL ENVIRONMENTAL LIGHT | 31.4457 | ...... | 26.2762 | 30.8555 | ...... | 77.2000 |

36 — PRESET VIEWING LIGHT DATA

| | 250 [nm] | ...... | 380 [nm] | 390 [nm] | ...... | 780 [nm] |
|---|---|---|---|---|---|---|
| VIEWING LIGHT 1 | 31.2704 | ...... | 26.2762 | 31.2704 | ...... | 77.1857 |
| VIEWING LIGHT 2 | 30.8555 | ...... | 25.7554 | 30.8555 | ...... | 77.3929 |
| VIEWING LIGHT 3 | 31.4457 | ...... | 26.3999 | 31.4457 | ...... | 77.5585 |
| VIEWING LIGHT 4 | 2.8541 | ...... | 2.5803 | 2.8541 | ...... | 53.7894 |
| ⋮ | ⋮ | ⋮ | ⋮ | ⋮ | ⋮ | ⋮ |
| VIEWING LIGHT 10 | 8.8150 | ...... | 8.0086 | 8.8150 | ...... | 67.6108 |

33 — PRESET MEASURED DATA

MEDIUM 3
MEDIUM 2

| MEDIUM 1 | TEMP. | C | M | Y | K | 380 [nm] | 390 [nm] | ...... | 780 [nm] |
|---|---|---|---|---|---|---|---|---|---|
| PAPER WHITE | T1 | 0 | 0 | 0 | 0 | 0.2628 | 0.3127 | ...... | 0.7719 |
|  | T2 | 0 | 0 | 0 | 0 | 0.2576 | 0.3086 | ...... | 0.7739 |
|  | T3 | 0 | 0 | 0 | 0 | 0.2640 | 0.3145 | ...... | 0.7756 |
| PAPER WHITE UV CUT | T | 0 | 0 | 0 | 0 | 0.0327 | 0.0384 | ...... | 0.3721 |
| PAPER WHITE THREE-DIMENSIONAL FLUORESCENCE SPECTRUM | 250 [nm] | | | | | 0.0591 | 0.0680 | ...... | 0.1865 |
|  | 360 [nm] | | | | | 0.0383 | 0.0486 | ...... | 0.2297 |
|  | : | | | | | : | : | : | : |
|  | 780 [nm] | | | | | 0.0358 | 0.0457 | ...... | 0.1886 |
| COLOR PATCH | T1 | 0 | 0 | 10 | 0 | 0.0219 | 0.0297 | ...... | 0.2134 |
|  | T1 | 0 | 0 | 20 | 0 | 0.0297 | 0.0318 | ...... | 0.5080 |
|  | T1 | 0 | 0 | 30 | 0 | 0.0258 | 0.0285 | ...... | 0.5379 |
|  | : | : | : | : | : | : | : | : | : |
|  | T1 | 100 | 100 | 90 | 100 | 0.0801 | 0.0882 | ...... | 0.6761 |
|  | T1 | 100 | 100 | 100 | 100 | 0.0730 | 0.0808 | ...... | 0.7622 |
|  | T2 | 0 | 0 | 10 | 0 | 0.0591 | 0.0680 | ...... | 0.1865 |
|  | T2 | 0 | 0 | 20 | 0 | 0.0383 | 0.0486 | ...... | 0.2297 |
|  | T2 | 0 | 0 | 30 | 0 | 0.0232 | 0.0313 | ...... | 0.2259 |
|  | : | : | : | : | : | : | : | : | : |
|  | T2 | 100 | 100 | 90 | 100 | 0.0659 | 0.0734 | ...... | 0.1863 |
|  | T2 | 100 | 100 | 100 | 100 | 0.0559 | 0.0644 | ...... | 0.2275 |
|  | T3 | 0 | 0 | 10 | 0 | 0.0358 | 0.0457 | ...... | 0.1886 |
|  | T3 | 0 | 0 | 20 | 0 | 0.0219 | 0.0297 | ...... | 0.2134 |
|  | T3 | 0 | 0 | 30 | 0 | 0.0637 | 0.0669 | ...... | 0.7730 |
|  | : | : | : | : | : | : | : | : | : |
|  | T3 | 100 | 100 | 90 | 100 | 0.0448 | 0.0522 | ...... | 0.3359 |
|  | T3 | 100 | 100 | 100 | 100 | 0.0327 | 0.0384 | ...... | 0.3721 |
| COLOR PATCH UV CUT | T | 0 | 0 | 10 | 0 | 0.0358 | 0.0457 | ...... | 0.1886 |
|  | T | 0 | 0 | 20 | 0 | 0.0383 | 0.0486 | ...... | 0.2297 |
|  | T | 0 | 0 | 30 | 0 | 0.0637 | 0.0669 | ...... | 0.7730 |
|  | : | : | : | : | : | : | : | : | : |
|  | T | 100 | 100 | 90 | 100 | 0.0801 | 0.0882 | ...... | 0.6761 |
|  | T | 100 | 100 | 100 | 100 | 0.0730 | 0.0808 | ...... | 0.7622 |

FIG. 9

COLOR PROCESSING USING TEMPERATURE AND LIGHT SOURCE

BACKGROUND OF THE INVENTION

1. Field of the Invention

The present invention relates to color processing executed when a color conversion lookup table is generated.

2. Description of the Related Art

In order to control a printing apparatus to output desired colors, a color conversion lookup table (LUT) is used. The color conversion LUT includes an LUT used in calibration for maintaining a printing apparatus in a constant state, and that used in color matching, which is represented by International Color Consortium (ICC) profiles. Upon generating these color conversion LUTs, for example, a large number of color patches are output by the printing apparatus, and colors of the color patches are measured to obtain colorimetric values. Then, a color conversion LUT is generated by associating data of the color patches as device independent values input to the printing apparatus with the colorimetric values as device dependent values.

A general spectrophotometer measures a spectral reflectance which does not depend on a light source by dividing a spectral distribution obtained by irradiating an object to be measured with measurement light by that obtained by irradiating a perfect transmitting diffuser with identical measurement light. Then, using the spectral reflectance, a spectrum of a viewing light source, and a color matching function, the spectrophotometer outputs tristimulus values of a color of the object to be measured under a certain viewing light source as a colorimetric value.

On the other hand, most media (printing paper, developing paper, etc.) used in printing contain a fluorescence whitener which absorbs ultraviolet light (UV) and emits fluorescence in a visible range, so as to enhance a degree of white. Reflected light from a medium containing the fluorescence whitener includes reflected light components and fluorescence components from the medium, and a general spectrophotometer cannot accurately measure an object color of the medium containing the fluorescence whitener. This is because the reflected light components can be measured independently of the types of light sources, but the intensity and distribution of the fluorescence components change depending on the spectral distribution of a light source. For this reason, when measurement light used at the time of colorimetry is different from an actual viewing light source, luminescence by the fluorescence whitener is different, and an apparent spectral reflectance suffers a deviation.

In order to solve the aforementioned problem, the invention of Japanese Patent Laid-Open No. 10-176953 calculates an object color under a certain viewing light source by measuring the object color using measurement light in which UV is removed and that including UV. However, a whitening effect by a fluorescence whitener depends on temperatures, and colorimetric values of an image formed on a medium containing the fluorescence whitener depend on temperatures. The invention of Japanese Patent Laid-Open No. 10-176953 does not consider any temperature dependence of the whitening effect of the fluorescence whitener. In other words, in order to accurately generate a color conversion LUT for a medium containing a fluorescence whitener, an object color (to be referred to as paper white hereinafter) of a medium has to be measured in consideration of the influence of a fluorescence whitener contained in a medium, that is, the temperature dependence of the whitening effect.

SUMMARY OF THE INVENTION

In one aspect, a method of a color processing apparatus having a memory which stores a measured data table, and a measurement section which measures color values, the method comprising the steps of: obtaining a first color value of a printing medium under a first light source which emits first light including light in an ultraviolet region and at a first temperature from either the measured data table or the measurement section; obtaining a second color value of the printing medium under the first light source and at a second temperature different from the first temperature from either the measured data table or the measurement section; and estimating a color value of the printing medium at a viewing temperature, which is different from the first temperature and the second temperature, from the obtained first color value and the second color value.

According to the aspect, a color value of a medium can be obtained in consideration of the influence of a fluorescence whitener contained in the medium.

Further features of the present invention will become apparent from the following description of exemplary embodiments with reference to the attached drawings.

DESCRIPTION OF THE EMBODIMENTS

Color processing according to embodiments of the present invention will be described hereinafter with reference to the drawings.

First Embodiment

[Apparatus Arrangement]

Figure 1:
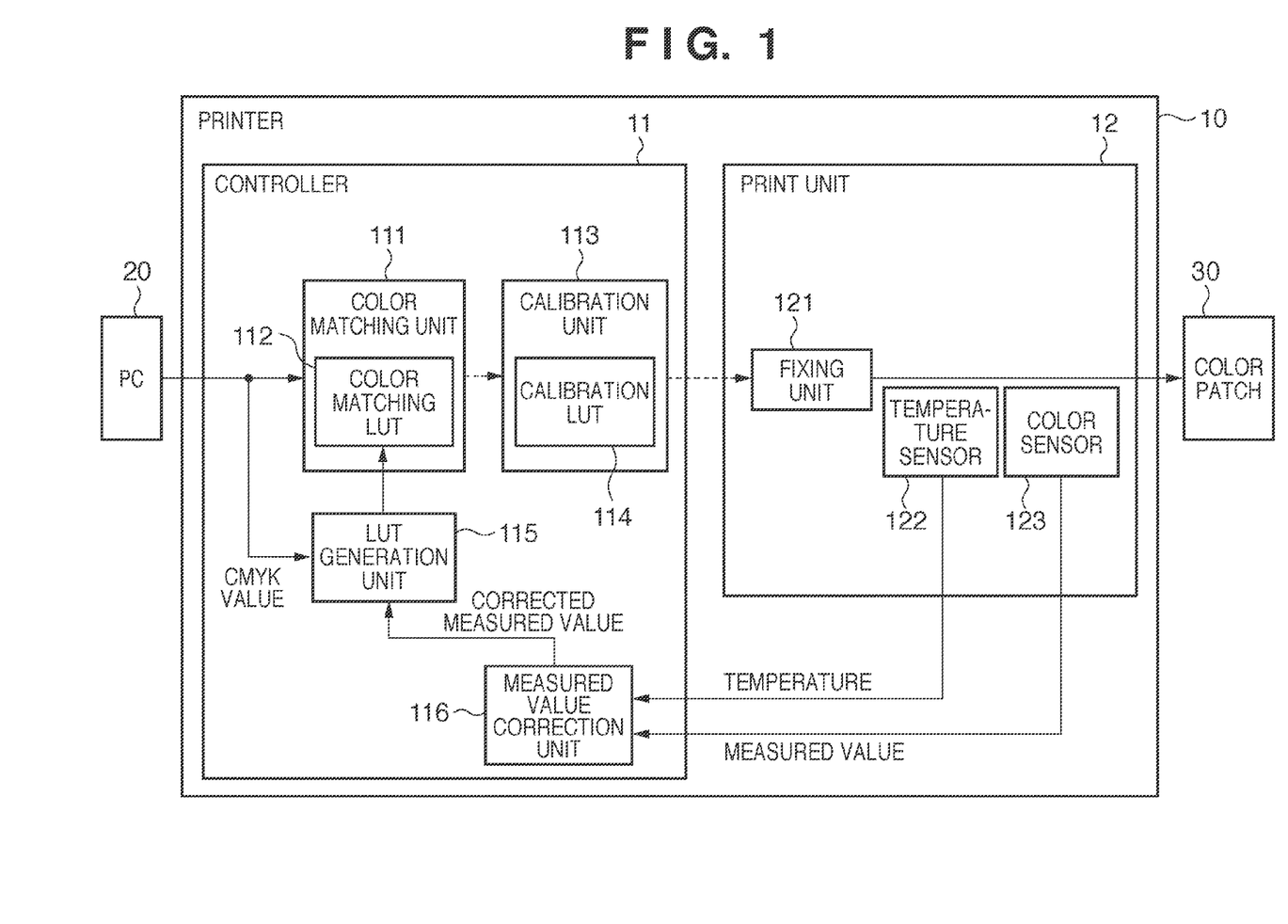
FIG. 1 is a block diagram for explaining the arrangement of a printer which executes color processing according to the first embodiment.

The arrangement of a printer, which executes color processing according to the first embodiment, will be described below with reference to the block diagram shown in FIG. 1.

A printer 10 prints a plurality of color patches 30 for color matching before or during execution of a print job, so as to attain accurate color matching. Then, the printer 10 measures colors of the color patches 30 using a color sensor 123 included in itself, and generates and updates a color matching LUT 112 as a color conversion table. Since the color patches 30 immediately after fixing are at high temperature, and colorimetric values vary under the aforementioned influence of a fluorescence whitener, correction of the colorimetric values is required.

A controller 11 of the printer 10 comprises a color matching unit 111 including the color matching LUT 112 and a calibration unit 113 including calibration LUTs 114. Furthermore, the controller 11 comprises an LUT generation unit 115 which generates the color matching LUT 112, and a measured value correction unit 116. Note that the controller 11 configured by a microprocessor (CPU) and memories include components that execute various other functions, but a description of these components will not be given.

The color matching unit 111 color-converts an image to be printed using the color matching LUT 112 represented by an ICC profile by a color matching module (CMM). The calibration unit 113 performs correction to maintain the output state of the printer 10 constant using the calibration LUTs 114 represented by C, M, Y, and K linear LUTs used in general color calibration. The measured value correction unit 116 temperature-corrects measured values and outputs those at a predetermined temperature. The LUT generation unit 115 generates and updates the color matching LUT 112 using the measured values at the predetermined temperature output from the measured value correction unit 116.

A print unit 12 of the printer 10 has a fixing unit 121, a temperature sensor 122, and the color sensor 123. Note that the print unit 12 includes components which execute various other functions, but a description of these components will not be given.

The fixing unit 121 includes a heat source such as a halogen heater, melts toners (color materials) by heat, and fixes the melted toners on a medium (printing medium) by a pressure. The temperature sensor 122 is arranged in the vicinity of the color sensor 123, and measures the temperature of the medium at the time of measurement of the color patches 30.

Figure 2:
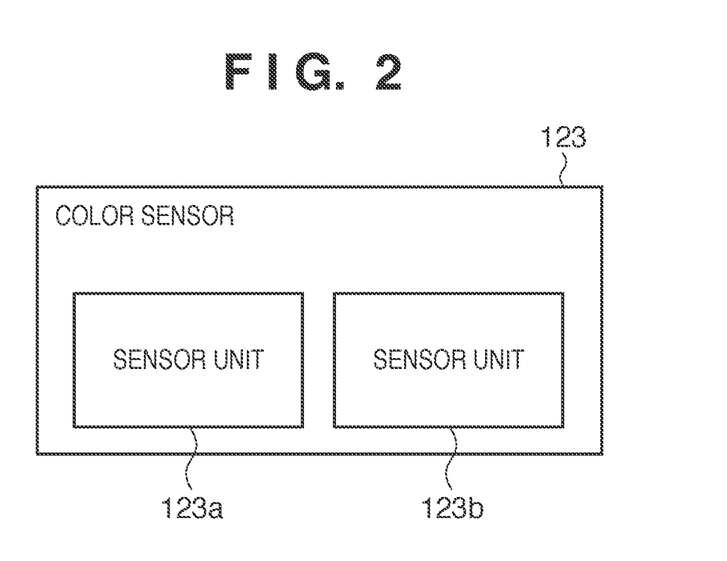
FIG. 2 is a diagram for explaining the arrangement of a color sensor.

The arrangement of the color sensor 123 will be described below with reference to FIG. 2. The color sensor 123 is arranged on a convey path that connects the fixing unit 121 and an exhaust port of a medium. As shown in FIG. 2, the color sensor 123 includes a sensor unit 123*a* (first measurement unit) as a spectrophotometer using a light source which emits measurement light including UV (first light source). Furthermore, the color sensor 123 includes a sensor unit 123*b* (second measurement unit) as a spectrophotometer using a light source which emits measurement light that does not include any UV (to be referred to as a UV cut light source hereinafter: second light source). A light source, which emits UV weaker than that emitted by the first light source outside a visible range, is available. When such light source (to be referred to as a relatively low UV light source) is used, if the whitening effect of a fluorescence whitener contained in a medium is sufficiently smaller than the first light source, the relatively low UV light source can be used as the second light source. In the following description, the relatively low UV light source will also be explained as a "UV cut light source".

Figure 3:
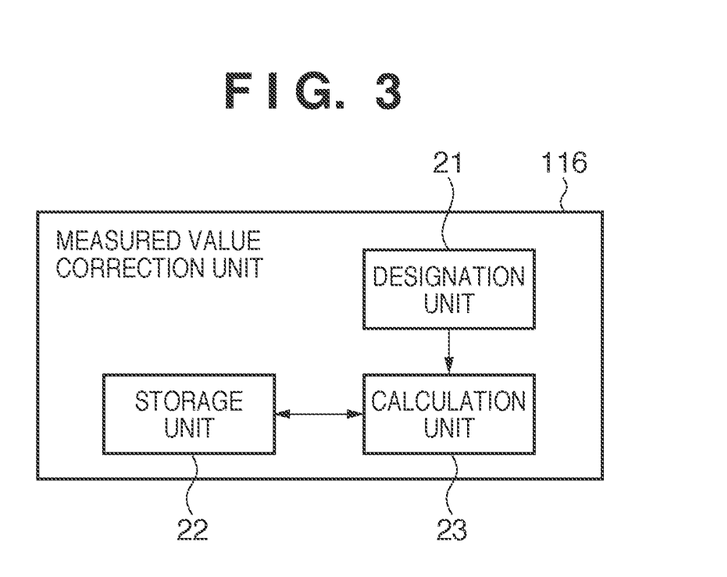
FIG. 3 is a block diagram for explaining the arrangement of a measured value correction unit.

The arrangement of the measured value correction unit 116 will be described below with reference to the block diagram shown in FIG. 3. The measured value correction unit 116 comprises a designation unit 21 which provides a user interface (UI) and inputs setting information, a storage unit 22 which stores light source values and measured values, and a calculation unit 23 which temperature-corrects the measured values.

Figure 4:
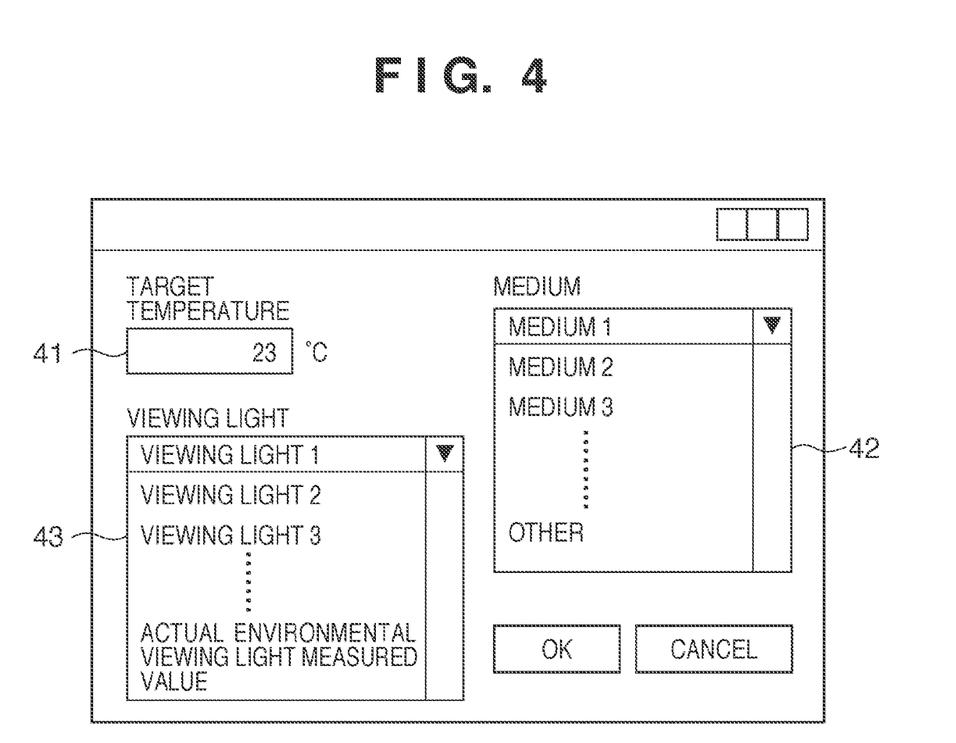
FIG. 4 is a view showing an example of a user interface provided by a designation unit.

The designation unit 21 displays a UI shown in FIG. 4 on a monitor of the printer 10 or that of a personal computer (PC) 20 (neither are shown). The UI includes a target temperature setting area 41, medium type setting area 42, and viewing light setting area 43. The user sets a temperature upon viewing a printed matter (to be referred to as a viewing temperature hereinafter) by operating the setting area 41. For example, when the user views a printed matter outdoors in cold climates, he or she sets, for example, 0° C. When the user views a printed matter indoors, he or she sets, for example, 20° C. The user may set, for example, a standard temperature in the measurement field, that is, 23° C. (JIS Z 8703). The user sets a type of a medium on which the color patches 30 are printed by operating the setting area 42, and sets environmental light (viewing light) upon viewing a printed matter by operating the setting area 43. A combination of the viewing temperature and viewing light is also called a "viewing environment".

Figure 5A:
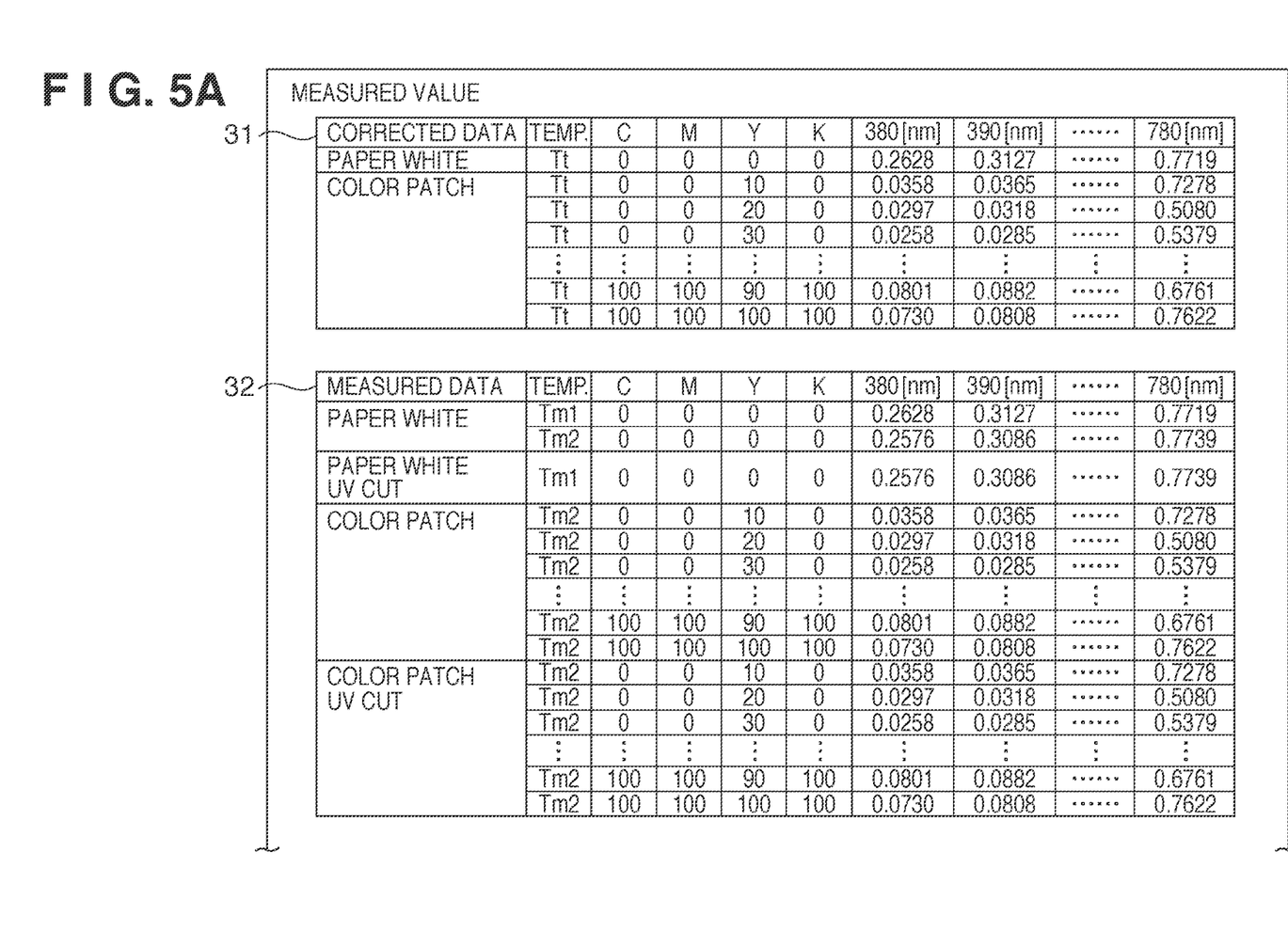
FIGS. 5A and 5B are a view for explaining a storage method of colorimetric values by a storage unit.
Figure 5B:
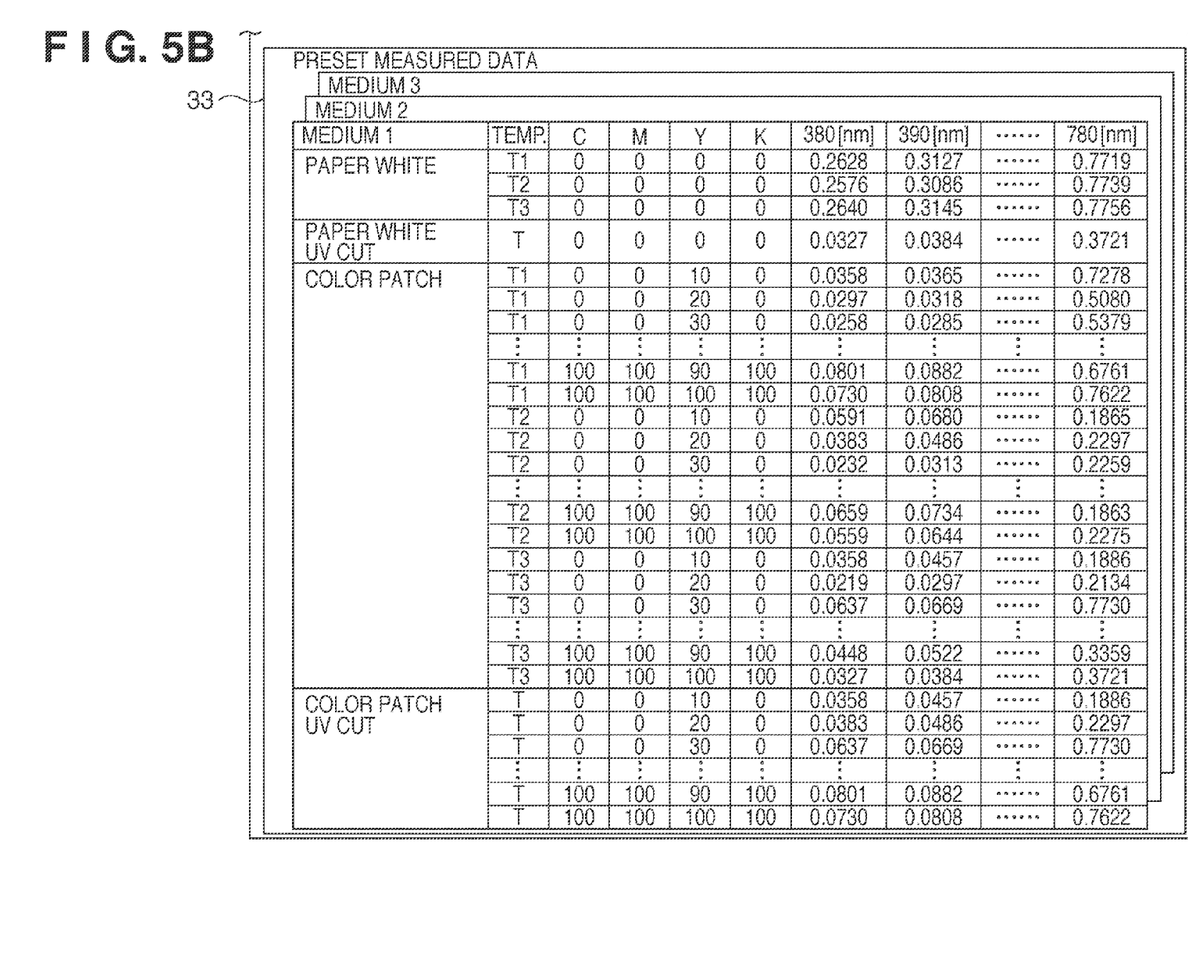

A storage method of measured values by the storage unit 22 will be described below with reference to FIGS. 5A and 5B. The storage unit 22 stores corrected data 31, measured data 32, and preset measured data 33, each of which is configured by a temperature, C, M, Y, and K values of a color patch, and spectral reflectance. The corrected data 31 include measured values which are output from the measured value correction unit 116 and are corrected according to the viewing environment (viewing temperature and viewing light). The measured data 32 include measured values before correction, which are measured by the temperature sensor 122 and color sensor 123. The preset measured data 33 include measured values which are obtained by measuring paper white values of various media and color patches printed on these media at a plurality of temperatures in advance by a spectrophotometer using a UV including light source and that using a UV cut light source.

Figure 6:
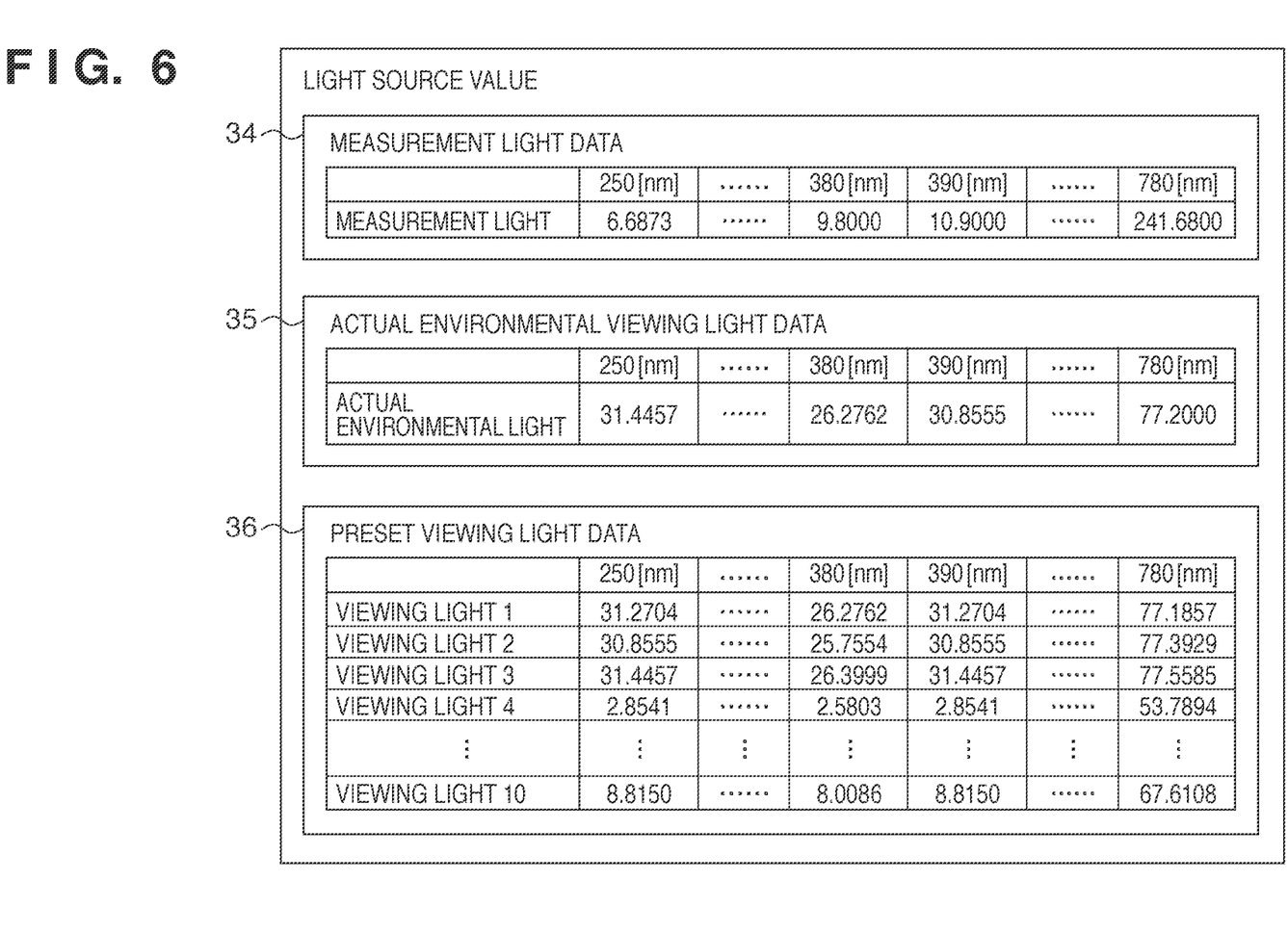
FIG. 6 is a view for explaining a storage method of light source values by the storage unit.

A storage method of light source values by the storage unit 22 will be described below with reference to FIG. 6. The storage unit 22 stores measurement light data 34, actual environmental viewing light data 35, and preset viewing light data 36, each of which is configured by spectral illuminance values including an ultraviolet region. The measurement light data 34 include spectral illuminance values of the UV including light source used by the sensor unit 123*a*. The actual environmental viewing light data 35 include spectral illuminance values obtained by measuring viewing light in an actual environment. The preset viewing light data 36 include spectral illuminance values of representative light sources, which are held in advance.

[Generation of Color Matching LUT]

Figure 7:
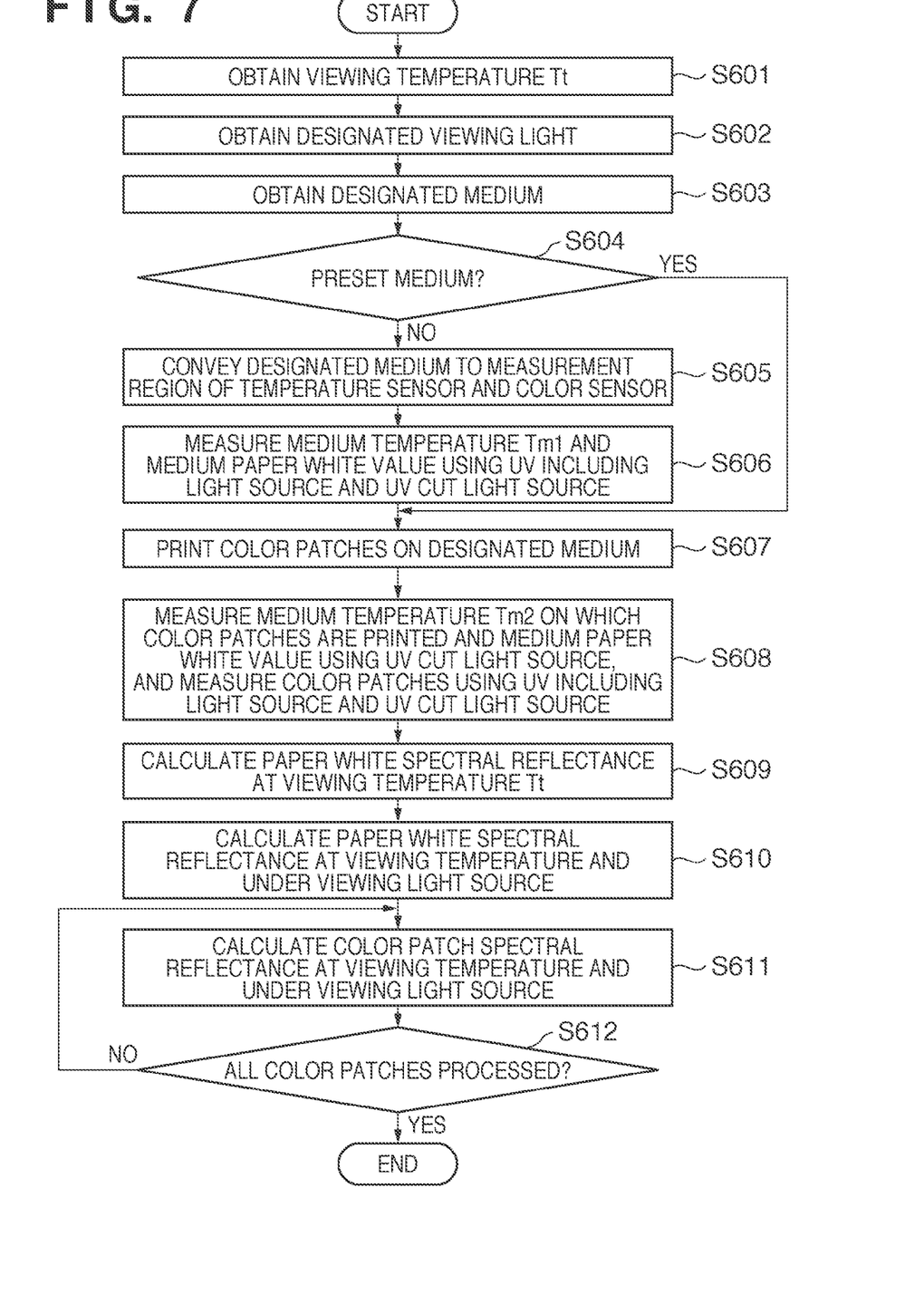
FIG. 7 is a flowchart for explaining a generation method of a color matching LUT.

A generation method of the color matching LUT 112 will be described below with reference to the flowchart shown in FIG. 7. This processing is executed by the measured value correction unit 116.

The calculation unit 23 of the measured value correction unit 116 obtains a viewing temperature Tt via the setting area 41 (S601). Furthermore, the calculation unit 23 obtains a designated medium type used in generation of the color matching LUT 112 via the setting area 42 (S602), and also designated viewing light via the setting area 43 (S603).

The calculation unit 23 then determines whether or not the designated medium type is included in those registered in the preset measured data 33, in other words, whether or not the designated medium type indicates a preset medium (S604). If the designated medium type does not indicate any preset medium, a designated medium, on which no image is printed, is conveyed to a measurement region of the temperature sensor 122 and color sensor 123 (S605). Then, the temperature sensor 122 and color sensor 123 measure a medium temperature Tm1, and a spectral reflectance of paper white of the designated medium using the UV including light source and UV cut light source, and store the measurement results in the storage unit 22 (S606). In the following description, the spectral reflectance of paper white will be explained as a "paper white spectral reflectance". Note that even when the medium passes through the fixing unit 121 in step S605, the heater of the fixing unit 121 is kept OFF. Therefore, the medium temperature Tm1 is nearly equal to a room temperature in step S606.

The calculation unit 23 controls the print unit 12 to print the color patches 30 on the designated medium (S607). Then, the temperature sensor 122 measures a temperature Tm2 of the medium on which the color patches 30 are printed, and the color sensor 123 measures a paper white spectral reflectance of the medium for the UV cut light source. Furthermore, the color sensor 123 measures spectral reflectances of the color patches 30 for the UV including light source and UV cut light source. In the following description, a spectral reflectance of a color patch will be explained as a "color patch spectral reflectance". Then, these measurement results are stored in the storage unit 22 (S608). Then, the calculation unit 23 calculates a paper white spectral reflectance at the viewing temperature Tt using:

if (preset medium)

$$PWt(\lambda)=PW1(\lambda)+\{PW2(\lambda)-PW1(\lambda)\}\times(Tt-T1)/(T2-T1); \quad (1)$$

where

Tt is a viewing temperature,

T1 and T2 are first and second temperatures recorded in the preset measured data, $PW1(\lambda)$ is a paper white spectral reflectance at T1, $PW2(\lambda)$ is a paper white spectral reflectance at T2, and $PWt(\lambda)$ is a paper white spectral reflectance at the viewing temperature Tt.

if (non-preset medium)

$$PWt(\lambda)=PWm1(\lambda)+\{PWm2(\lambda)-PWm1(\lambda)\}\times(Tt-Tm1)/(Tm2-Tm1); \quad (2)$$

where

Tm1 is a medium temperature at the time of paper white measurement (S606),

Tm2 is a medium temperature at the time of color patch measurement (S608), $PWm1(\lambda)$ is a paper white measured value by the UV including light source at the time of paper white measurement (S606), and $PWm2(\lambda)$ is a paper white measured value by the UV including light source at the time of color patch measurement (S608).

The calculation unit 23 stores the calculated paper white spectral reflectance in the storage unit 22 (S609). Note that toners are fixed on the medium by heat and pressure of the fixing unit 121 in step S607, and measurements are made immediately after fixing. Therefore, in the measurements in step S608, the medium temperature Tm2 is higher than a room temperature.

Note that T1, T2, $PW1(\lambda)$, and $PW2(\lambda)$ are obtained from the preset measured data 33. Also, $\lambda$ is a wavelength. In this embodiment, for example, calculations are made at 10-nm pitches in a visible range (380 to 780 nm). Furthermore, Tm1, Tm2, $PWm1(\lambda)$, and $PWm2(\lambda)$ are obtained from the measured data 32.

Next, the calculation unit 23 calculates a paper white spectral reflectance in the viewing environment (viewing temperature, viewing light) using:

$$PWto(\lambda)=PWcut(\lambda)+\{PWt(\lambda)-PWcut(\lambda)\}\times O/M \quad (3)$$

where $PWcut(\lambda)$ is a paper white measured value using the UV cut light source, $PWto(\lambda)$ is a paper white spectral reflectance in the viewing environment, O is a parameter which represents a strength of a whitening effect under the viewing light, and M is a parameter which represents a strength of a whitening effect under the measurement light including UV.

The calculation unit 23 stores the calculated paper white spectral reflectance in the storage unit 22 (S610).

Note that O is calculated from the characteristics of the actual environmental viewing light data 35 or preset viewing light data 36. M is calculated from the characteristics of the measurement light data 34. Also, $PWcut(\lambda)$ is obtained from the preset measured data 33 or measured data 32.

Figure 8:
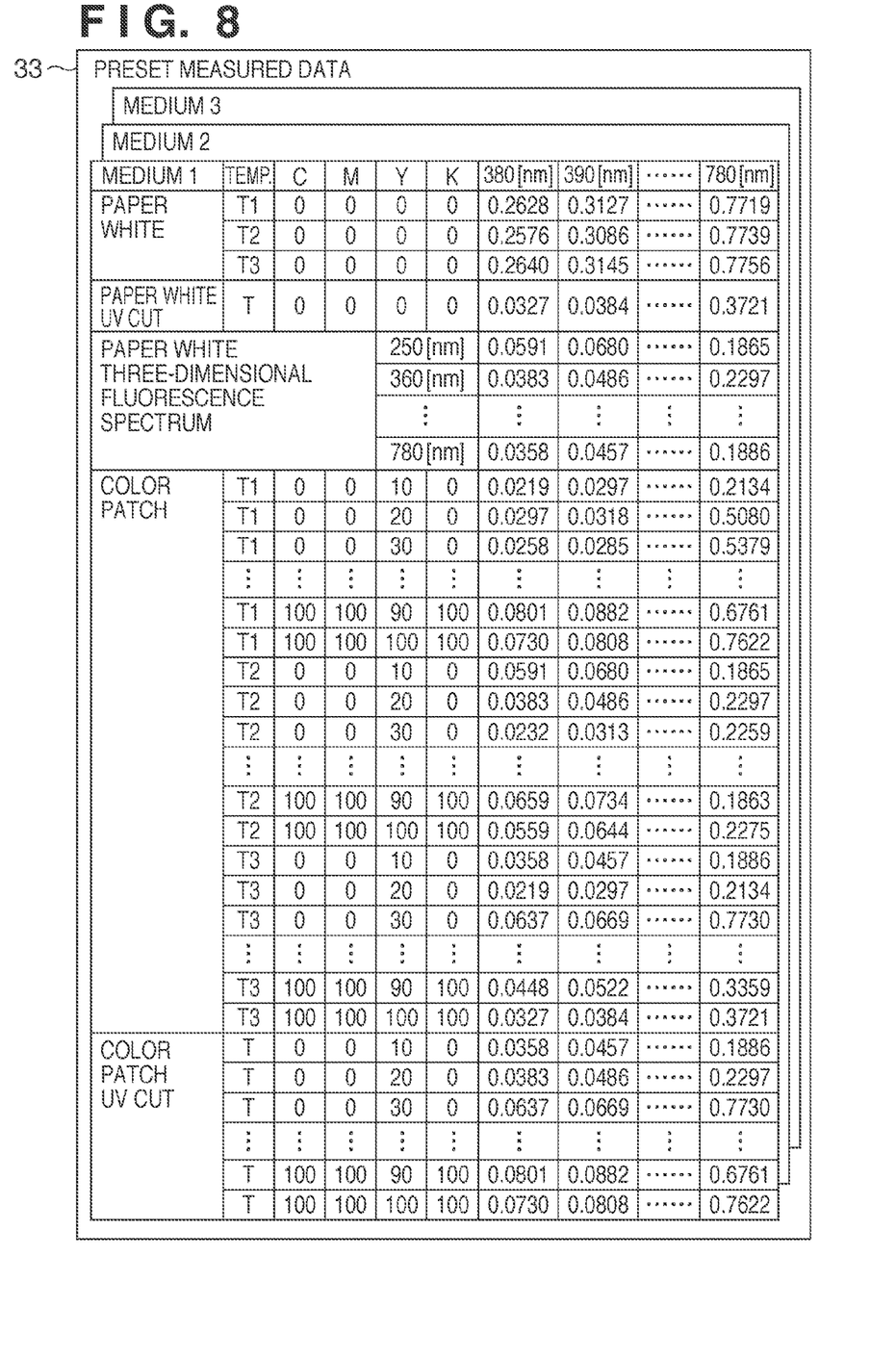
FIG. 8 is a view for explaining an example of holding fluorescence spectra in preset measured data.

In the example of equation (3), the parameters O and M indicate constant values irrespective of a wavelength. Alternatively, parameters which consider a wavelength dependence may be used. For example, in case of a preset medium, as exemplified in FIG. 8, three-dimensional fluorescence spectra for respective medium types, which are measured in advance using a fluorescence spectrophotometer, are held in the preset measured data 33. Then, the parameter O adopts a fluorescence spectral radiance factor under the viewing light, which is calculated from the viewing light and three-dimensional fluorescence spectra. Also, the parameter M adopts a fluorescence spectral radiance factor under the measurement light, which is calculated from the measurement light data of the UV including light source and three-dimensional fluorescence spectra. These parameters O and M are respectively calculated by:

$$M=M(\lambda)=\Sigma_{\lambda'=300\,nm}^{780\,nm} Q(\lambda,\lambda') \cdot m(\lambda') \Delta\lambda'$$

$$O=O(\lambda)=\Sigma_{\lambda'=300\,nm}^{780\,nm} Q(\lambda,\lambda') \cdot o(\lambda') \Delta\lambda' \quad (4)$$

where $M(\lambda)$ is a fluorescence spectral radiance factor of the viewing light, $O(\lambda)$ is a fluorescence spectral radiance factor of the measurement light, $m(\lambda')$ is a viewing light value, $o(\lambda')$ is a measurement light value, and $Q(\lambda, \lambda')$ is a measured value of a fluorescent component obtained by measuring each preset medium using a fluorescence spectrophotometer (bi-spectral system).

Next, the calculation unit 23 calculates a color patch spectral reflectance in the viewing environment (viewing temperature, viewing light), and stores it in the storage unit 22 (S611). When a measured value using the UV including light source is used as that of the color patch, equation (5) is used. When a measured value using the UV cut light source is used as that of the color patch, equation (6) is used.

$$Rto(\lambda)=Rm2(\lambda) \times PWto(\lambda)/PWm2(\lambda) \quad (5)$$

$$Rto(\lambda)=Rcut2(\lambda) \times PWto(\lambda)/PWcut(\lambda) \quad (6)$$

where $Rm2(\lambda)$ is a color patch measured value using the UV including light source, $PWm2(\lambda)$ is a paper white measured value using the UV including light source (in case of a preset medium, $PW2(\lambda)$ is used in place of $PWm2(\lambda)$), Rcut2(λ) is a color patch measured value using the UV cut light source, PWcut(λ) is a paper white measured value using the UV cut light source, and Rto(λ) is a color patch spectral reflectance in the viewing environment.

Note that Rm2(λ), Rcut2(λ), PWm2(λ), and PWcut(λ) are obtained from the measured data 32.

Next, the calculation unit 23 determines whether or not Rto(λ) values have been calculated for all the color patches (S612), and repeats the processing in step S611 until the Rto(λ) values of all the color patches are calculated.

Upon completion of calculations of the Rto(λ) values of all the color patches, the LUT generation unit 115 generates a color matching LUT from the paper white and color patch spectral reflectance values in the viewing environment (viewing temperature, viewing light), and C, M, Y, and K signal values (color material amount values) of the color patches, which are stored in the storage unit 22. Then, the LUT generation unit 115 updates the color matching LUT 112 in the color matching unit 111 by the generated color matching LUT.

In this way, the printer 10 measures the colors of the color patches 30 using the color sensor 123 included in itself, and generates and updates the color matching LUT 112, so as to attain accurate color matching. In this case, since the color patches 30 immediately after fixing are at high temperatures, and the measured values vary under the influence of a fluorescence whitener, correction of the measured values is required. Hence, upon measurement of the spectral reflectance values of the color patches 30, the medium temperature and paper white spectral reflectance values using the UV including light source and UV cut light source are measured, and the measured values (spectral reflectance values) of the color patches 30 according to the viewing environment (viewing temperature, viewing light) are calculated. Therefore, the color matching LUT 112 can be prevented from being influenced by variations of the measured values under the influence of a fluorescence whitener, and the color matching LUT 112 suited to viewing of a printed matter in the viewing environment (viewing temperature, viewing light) can be generated.

Modification of Embodiment

In the above description, the color patches are measured using the UV including light source and UV cut light source (including the relatively low UV light source). However, the color patches may be measured using either one of these light sources. Also, the color sensor 123 may be configured by either one of the sensor unit 123a using the UV including light source and the sensor unit 123b using the UV cut light source. In this case, data which cannot be measured due to the absence of one color sensor are obtained from the preset measured data 33.

In the above description of the example, a spectral reflectance is used as a measured value. Alternatively, XYZ values and other color values (for example, Lab values and Luv values) may be used.

Second Embodiment

Color processing according to the second embodiment of the present invention will be described below. Note that the same reference numerals in the second embodiment denote the same components as those in the first embodiment, and a detailed description thereof will not be repeated.

Figure 9:
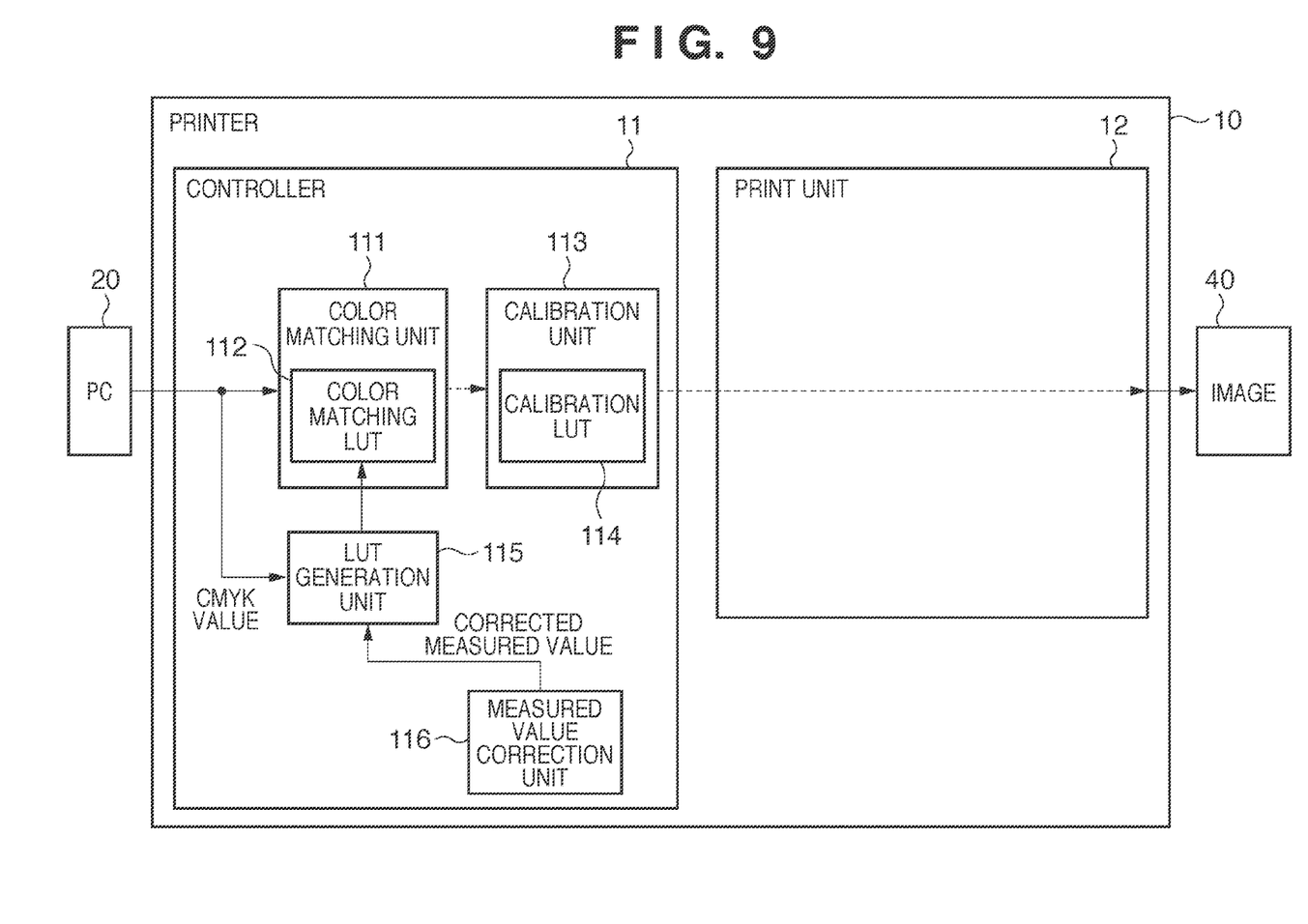
FIG. 9 is a block diagram for explaining the arrangement of a printer which executes color processing according to the second embodiment.

The arrangement of a printer, which executes the color processing of the second embodiment, will be described below with reference to the block diagram shown in FIG. 9.

A printer 10 of the second embodiment attains accurate color matching at an arbitrary viewing temperature Tt by holding measured values obtained by measuring a plurality of color patches at a plurality of temperatures in advance, and generating and updating a color matching LUT 112 at the arbitrary viewing temperature from these measured values.

Figure 10:
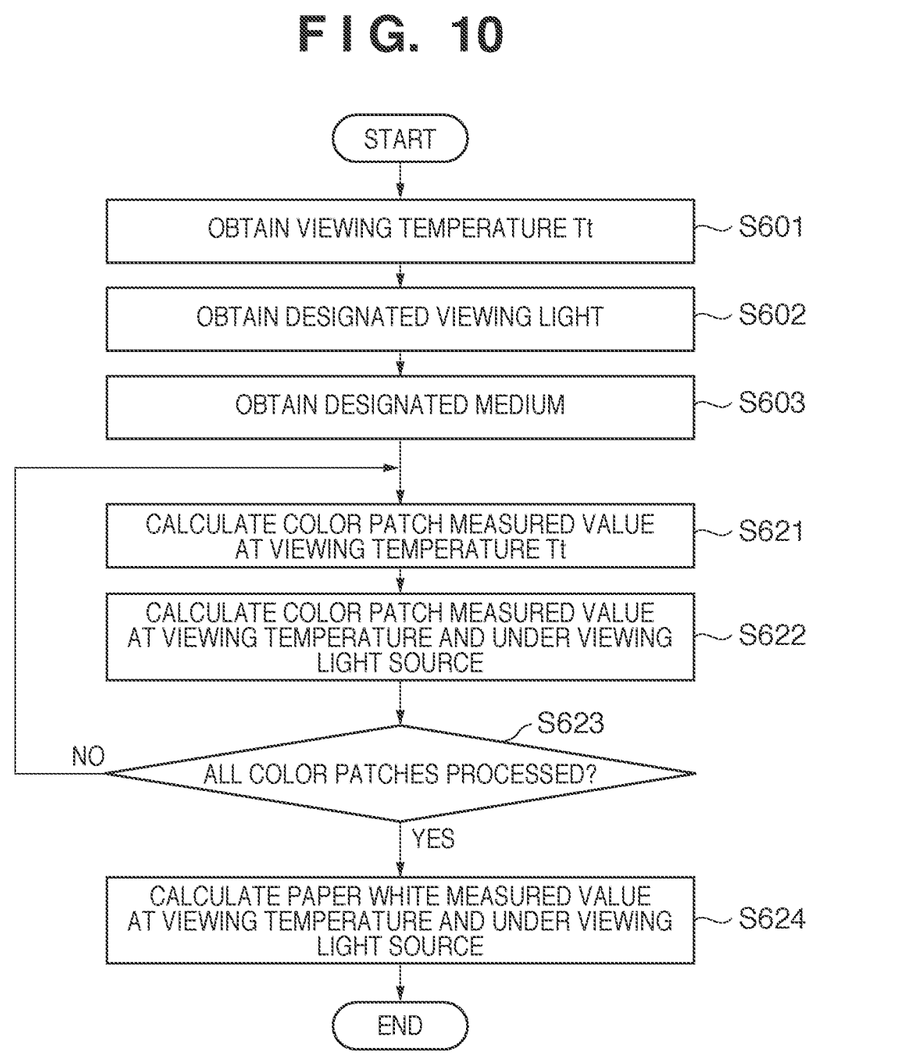
FIG. 10 is a flowchart for explaining a generation method of a color matching LUT according to the second embodiment.

A generation method of the color matching LUT 112 of the second embodiment will be described below with reference to the flowchart shown in FIG. 10. This processing is executed by a measured value correction unit 116. Note that processes in steps S601 to S603 are the same as those in the processing (FIG. 7) of the first embodiment, and a detailed description thereof will not be repeated.

A calculation unit 23 of the measured value correction unit 116 calculates a color patch measured value at a viewing temperature by:

$$Rt(\lambda)=R1(\lambda)+\{R2(\lambda)-R1(\lambda)\}\times(Tt-T1)/(T2-T1) \qquad (7)$$

where

R1(λ) is a color patch spectral reflectance at T1,

R2(λ) is a color patch spectral reflectance at T2, and

Rt(λ) is a color patch spectral reflectance at the viewing temperature Tt.

The calculation unit 23 stores the calculated measured value in a storage unit 22 (S621).

Note that T1, T2, R1(λ), and R2(λ) are obtained from preset measured data 33.

Next, the calculation unit 23 calculates a color patch measured value in a viewing environment (viewing temperature, viewing light) by:

$$Rto(\lambda)=Rcut(\lambda)+\{Rt(\lambda)-Rcut(\lambda)\}\times O/M \qquad (8)$$

where

Rcut(λ) is a color patch measured value using a UV cut light source,

O is a parameter which represents a strength of a whitening effect under the viewing light, and M is a parameter which represents a strength of a whitening effect under the measurement light including UV.

The calculation unit 23 stores the calculated measured value in the storage unit 22 (S622).

Note that O is calculated from the characteristics of actual environmental viewing light data 35 or preset viewing light data 36. M is calculated from the characteristics of measurement light data 34. Also, Rcut(λ) is obtained from the preset measured data 33.

Next, the calculation unit 23 determines whether or not Rto(λ) values have been calculated for all the color patches (S623), and repeats the processes in steps S621 and S622 until the Rto(λ) values of all the color patches are calculated. Upon completion of the calculations of the Rto(λ) values of all the color patches, the calculation unit 23 calculates paper white measured values PWto(λ) in the viewing environment (viewing temperature, viewing light) by the same processes as in equations (6) and (7), and stores them in the storage unit 22 (S624).

After the calculations of the Rto(λ) values and paper white values PWto(λ) of all the color patches by the calculation unit 23 are complete, an LUT generation unit 115 generates a color matching LUT based on the paper white and color patch spectral reflectance values in the viewing environment (viewing temperature, viewing light), and C, M, Y, and K signal values (color material amount values) of the color patches, which are stored in the storage unit 22. Then, the LUT generation unit 115 updates the color matching LUT 112 in a color matching unit 111 by the generated color matching LUT.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-251355, filed Oct. 30, 2009 and No. 2010-230106, filed Oct. 12, 2010, which are hereby incorporated by reference herein in their entirety.

What is claimed is:

1. A color processing apparatus comprising:
a memory which stores a measured data table;
a measurement section which measures color values;
a first obtaining section, configured to obtain a first color value of a printing medium under a first light source which emits first light including light in an ultraviolet region and at a first temperature from either the measured data table or the measurement section;
a second obtaining section, configured to obtain a second color value of the printing medium under the first light source and at a second temperature different from the first temperature from either the measured data table or the measurement section;
a first estimator, configured to estimate a color value of the printing medium at a viewing temperature, which is different from the first temperature and the second temperature, from the obtained first color value and the second color value;
a third obtaining section, configured to obtain a third color value of the printing medium under a second light source which emits second light including light in the ultraviolet region weaker than the first light from either the measured data table or the measurement section; and
a second estimator, configured to estimate a color value of the printing medium at the viewing temperature and under viewing light, based on the color value of the printing medium at the viewing temperature and the third color value of the printing medium under the second light source.

2. The apparatus according to claim 1, wherein in the estimation of the color value of the printing medium at the viewing temperature and under the viewing light, a ratio of a parameter which represents a whitening effect of a fluorescence whitener under the first light source and a parameter which represents a whitening effect of the fluorescence whitener of the printing medium under the viewing light is considered.

3. The apparatus according to claim 1, wherein the measurement section comprises the first light source and the second light source, and a temperature sensor which measures a temperature of the printing medium at the time of measurement of the color value,
wherein the first obtaining section and the second obtaining section obtain a temperature measurement result of the printing medium together with measurement results of the first color value and the second color value.

4. The apparatus according to claim 1, further comprising:
a fourth obtaining section, configured to obtain color values of color patches printed on the printing medium under the first light source and at the second temperature from either the measured data table or the measurement section; and
a third estimator, configured to estimate color values of the color patches at the viewing temperature and under the viewing light from the color values of the color patches, the color value of the printing medium at the viewing temperature and under the viewing light, and the second color value of the printing medium.

5. The apparatus according to claim 1, further comprising:
a fourth obtaining section, configured to obtain color values of color patches printed on the printing medium under the second light source from either the measured data table or the measurement section; and
a third estimator, configured to estimate color values of the color patches at the viewing temperature and under the viewing light from the color values of the color patches, the color value of the printing medium at the viewing temperature and under the viewing light, and the third color value of the printing medium.

6. A method of a color processing apparatus having a memory which stores a measured data table, and a measurement section which measures color values, the method comprising:
using a processor to perform the steps of:
obtaining a first color value of a printing medium under a first light source which emits first light including light in an ultraviolet region and at a first temperature from either the measured data table or the measurement section;
obtaining a second color value of the printing medium under the first light source and at a second temperature different from the first temperature from either the measured data table or the measurement section;
estimating a color value of the printing medium at a viewing temperature, which is different from the first temperature and the second temperature, from the obtained first color value and the second color value;
obtaining a third color value of the printing medium under a second light source which emits second light including light in the ultraviolet region weaker than the first light from either the measured data table or the measurement section; and
estimating a color value of the printing medium at the viewing temperature and under viewing light, based on the color value of the printing medium at the viewing temperature and the third color value of the printing medium under the second light source.

7. A non-transitory computer readable medium storing a computer-executable program for causing a computer to perform a method of a color processing apparatus having a memory which stores a measured data table, and a measurement section which measures color values, the method comprising:

obtaining a first color value of a printing medium under a first light source which emits first light including light in an ultraviolet region and at a first temperature from either the measured data table or the measurement section;

obtaining a second color value of the printing medium under the first light source and at a second temperature different from the first temperature from either the measured data table or the measurement section;

estimating a color value of the printing medium at a viewing temperature, which is different from the first temperature and the second temperature, from the obtained first color value and the second color value;

obtaining a third color value of the printing medium under a second light source which emits second light including light in the ultraviolet region weaker than the first light from either the measured data table or the measurement section; and estimating a color value of the printing medium at the viewing temperature and under viewing light, based on the color value of the printing medium at the viewing temperature and the third color value of the printing medium under the second light source.

* * * * *